United States Patent
Kloeppner (10) Patent No.: US 10,161,689 B2
(45) Date of Patent: Dec. 25, 2018

(54) HEAT EXCHANGER AND METHOD OF WETTING HEAT EXCHANGERS

(71) Applicant: A-HEAT Allied Heat Exchange Technology AG, Vienna (AT)

(72) Inventor: Michael Kloeppner, Kottgeisering (DE)

(73) Assignee: A-HEAT Allied Heat Exchange Technology AG, Vienna (AT)

(*) Notice: Subject to any disclaimer, the term of this patent is extended or adjusted under 35 U.S.C. 154(b) by 600 days.

(21) Appl. No.: 13/964,029

(22) Filed: Aug. 9, 2013

(65) Prior Publication Data

US 2014/0041834 A1 Feb. 13, 2014

(30) Foreign Application Priority Data

Aug. 9, 2012 (EP) ..................................... 12179934

(51) Int. Cl.
| | |
|---|---|
| F28F 1/00 | (2006.01) |
| F28F 25/02 | (2006.01) |
| F28D 1/00 | (2006.01) |
| F28D 5/00 | (2006.01) |
| F28F 27/02 | (2006.01) |

(52) U.S. Cl.
CPC ............... *F28F 1/00* (2013.01); *F28F 25/02* (2013.01); *F25B 2313/004* (2013.01);
(Continued)

(58) Field of Classification Search
CPC .... F28F 1/00; F28F 25/02; F28F 27/02; F28F 2250/08; F28F 5/0035; F28D 1/00;
(Continued)

(56) References Cited

U.S. PATENT DOCUMENTS 3,384,165 A * 5/1968 Mathews .................. F28B 1/06
165/122
3,395,903 A * 8/1968 Meek ........................ F28C 1/02
261/112.2
(Continued)

FOREIGN PATENT DOCUMENTS

| CH | 693043 A5 | 1/2003 |
|---|---|---|
| DE | 2840317 A1 | 4/1979 |

(Continued)

OTHER PUBLICATIONS

European Search Report dated Jan. 30, 2013 in EP Application No. 12179934.0.

*Primary Examiner* — Jianying Atkisson
*Assistant Examiner* — Joel Attey
(74) *Attorney, Agent, or Firm* — Kilpatrick Townsend & Stockton LLP (57) ABSTRACT

A heat exchanger including at least one first module and one second module for the heat exchange between a first fluid medium and a second fluid medium, wherein the first fluid medium can be conducted through a closed channel system separate from the second fluid medium, with the closed channel system being able to be flowed around by the second fluid medium and with the second fluid medium being gaseous. A first wetting apparatus is provided for the first module and a second wetting apparatus is provided for the second module by means of which the first module and the second module can be wetted by a third fluid medium, with the first wetting apparatus for the first module being able to be actuated independently of the wetting apparatus for the second module.

2 Claims, 4 Drawing Sheets (52) U.S. Cl.
CPC .......... *F25B 2339/041* (2013.01); *F28D 1/00* (2013.01); *F28D 5/00* (2013.01); *F28F 27/02* (2013.01); *F28F 2250/08* (2013.01); *Y02B 30/62* (2013.01)

(58) Field of Classification Search
CPC ..... F28D 5/00; Y02B 30/62; F25B 2313/004; F25B 2339/041
USPC ................................. 165/200; 62/183, 259.4
See application file for complete search history.

(56) References Cited

U.S. PATENT DOCUMENTS

| | | | | | |
|---|---|---|---|---|---|
| 4,266,406 | A | * | 5/1981 | Ellis ........................ | F25B 39/04 62/183 |
| 4,367,787 | A | * | 1/1983 | Bradshaw ........... | B05B 15/1222 118/326 |
| 5,701,748 | A | * | 12/1997 | Phelps .................. | F24F 5/0007 62/121 |
| 6,070,860 | A | * | 6/2000 | Kinney, Jr. ............... | F28C 1/04 261/109 |
| 6,338,257 | B1 | * | 1/2002 | Chiu ........................ | F24F 1/42 62/171 |
| 7,614,613 | B2 | * | 11/2009 | Shield ................... | F28F 27/003 165/900 |

FOREIGN PATENT DOCUMENTS

| | | |
|---|---|---|
| DE | 102010055449 A1 | 6/2012 |
| FR | 2724220 A1 | 3/1996 |
| GB | 1354607 A | 6/1974 |

\* cited by examiner

HEAT EXCHANGER AND METHOD OF WETTING HEAT EXCHANGERS

This application claims priority to European Application No. 12179934.0 filed on Aug. 9, 2012, the disclosure of which is incorporated by reference herein.

The invention relates to a heat exchanger including at least one first module and one second module for the heat exchange between a first fluid medium and a second fluid medium, wherein the first fluid medium can be conducted through a closed channel system separate from the second fluid medium. The closed channel system can be flowed around by the second fluid medium, with the second fluid medium being gaseous. A wetting apparatus is furthermore provided by means of which the second fluid medium can be wetted by a third fluid medium.

The invention furthermore relates to the use of a heat exchanger provided with a wetting apparatus in a cooling plant for room cooling or heat exchanging. Such a heat exchanger can in particular be used in the food industry, in the chemical industry, in the pharmaceutical industry or in the refrigerating or freezing of products.

The invention also relates to a method of wetting a heat exchanger including at least one first module and one second module for the heat exchange between a first fluid medium and a second fluid medium, wherein the first fluid medium is conducted through a closed channel system separate from the second fluid medium, with the closed channel system being flowed around by the second fluid medium, with the second fluid medium being gaseous. A third fluid medium wets the second fluid medium or the heat exchanger by means of a wetting apparatus.

Products, processes or media have to be cooled, frozen or deep-frozen in various sectors. Industrial cooling plants can be used for this purpose which are as a rule designed for high chilling capacities and therefore have an energy requirement which cannot be neglected.

Different solution approaches have been taken to reduce this energy requirement. On the one hand, the design of the heat exchanger can be modified; on the other hand, a wetting of the heat exchanger can be provided such as is disclosed in WO2010/040635 A1. This document shows a finned heat exchanger which in this simplest case is composed of a pipe for conducting through a heat transfer medium and a plurality of fins which are connected to the pipe and are in communication with a second medium in operation. This design is particularly expedient when the second medium is gaseous and is composed, for example, of ambient air since this has a comparatively low heat transfer coefficient which can be compensated by a correspondingly large surface of the fins. The finned heat exchanger can naturally also include a plurality of pipes for more than one heat transfer medium or the pipes can be connected to one another in parallel and/or in series as required.

A general description of finned tubular heat exchangers is also found in WO2011/003444 A1.

The heat transfer rate and the efficiency are essentially determined by the temperature difference between the fins, on the one hand, and the pipe or pipes, on the other hand. The temperature difference is the smaller, the greater the conductivity and the thickness of the fin are and the smaller the mutual spacing of the pipes is. So-called microchannel heat transfer elements have therefore been used for some years. They can, for example, be made as an extruded section which is manufactured from a material having good thermal conductivity, such as aluminum. The microchannel heat transfer elements contain a plurality of channels with a diameter usually in the range from 0.5 to 3 mm for the heat transfer medium. In the microchannel heat transfer element, extruded aluminum sections are preferably used instead of small pipes.

A further approach in the improvement of the heat transfer is to provide material with good heat conductivity for the fins or pipes. Since, however, the use of materials with very good heat conductivity such as copper has proved to be an uneconomic alternative in industrial cooling plants due to the material costs, an optimization in this area can only be justified while considering the material costs and is thus de facto limited to the choice of less expensive materials such as aluminum.

The approach taken in WO2010/040635 A1 of the use of a wetting apparatus has thus proved to be an advantageous approach for reducing the operating costs of the heat exchanger.

It is the object of the invention to improve the efficiency of a heat exchanger which includes at least two modules.

The object is satisfied by a heat exchanger including at least one first module) and one second module for the heat exchange between a first fluid medium and a second fluid medium, wherein the first fluid medium can be conducted through a closed channel system separate from the second fluid medium, with the closed channel system being able to be flowed around by the second fluid medium and with the second fluid medium being gaseous. Furthermore, a first wetting apparatus is provided for the first module and a second wetting apparatus is provided for the second module by means of which the first module and the second module can be wetted by a third fluid medium, wherein the first wetting apparatus for the first module can be actuated independently of the wetting apparatus for the second module.

The second fluid medium or the heat exchanger or the closed channel system are wetted by a third fluid medium by means of the first and second wetting apparatus which are in particular spray apparatus. In the case of a spray apparatus, a third fluid medium can accordingly be sprayed into the second fluid medium or onto the heat exchanger or onto the closed channel system. More than two modules can naturally also be provided. If a plurality of modules are provided, in particular at least 8 modules, provision can also be made that the wetting apparatus are regulated together pair-wise by two respective modules; that is the supply of the third medium to the modules connected together pair-wise takes place together.

The heat exchanger in accordance with the invention has the advantage that the cooling capacity can be directly matched to the demand thanks to the wetting apparatus which can be switched in separately or individually for each module so that the required cooling capacity can be delivered exactly by means of a temperature regulation. The cooling capacity is increased by the wetting with respect to a heat exchanger without a wetting apparatus with a predefined total exchange surface of the modules and with a predefined flow speed of the second medium and/or the total exchange surface of all modules is reduced for a predefined cooling capacity. The efficiency of the heat exchanger is thus increased by the wetting apparatus and is optimized by the possibility of selectively regulating the wetting apparatus of each individual module.

A big advantage of the heat exchanger in accordance with the invention is the avoidance of an abrupt power increase on the start of the wetting at just that point in time at which the wetting apparatus is switched in. In contrast to the prior art, the heat exchanger is not wetted over the full surface, which would have the consequence that the power increases abruptly as a result of the wetting since the heat exchange over the total exchange surface of all modules is increased simultaneously. The regulation of the heat exchanger can thus be improved overall with respect to the prior art because a higher precision of the regulation is made possible by the solution in accordance with the invention which was previously not possible for the solution in accordance with the prior art.

This also has the consequence of a considerably lower consumption of a third medium, in particular of the spray liquid. Up to 95% of the third medium can be saved with respect to the prior art, that is, for example, with respect to the solution described in WO2010/040635 A1, with the duration of the wetting being the same. This means that a substantial saving of third medium, that is of the spray liquid, in particular water, takes place. This also has the consequence that the use of cleansing agents for preparing the spray liquid can be reduced. In addition, due to the selective use of wetting apparatus, the service life thereof as well as the service life of the heat exchanger are increased.

On the other hand, corrosion phenomena can occur at the heat exchanger due to the use of a wetting apparatus, which can result in damage on an excessive operating time of the wetting apparatus. The annual duration of use of wetting apparatus has therefore been restricted to date. When the wetting apparatus can be connected in independently of one another, can in particular be connected in sequentially, the annual duration of use can thus be extended overall.

In accordance with the invention, only a part of the heat exchanger, a module, is thus wetted, that is in particular sprayed, with the third medium. A module of the heat exchanger is understood within the framework of this application as a chamber covered by a fan.

The wetting of each module takes place sequentially, that is individual modules are wetted by the third medium after one another in time. This in particular means that the total duration of the spraying is composed of the individual time periods in which a respective one module is sprayed with water. It is ensured in this respect by the regulation that the time period for each individual module is substantially of equal length, that is that the time periods for the spraying are substantially of equal length for each module. At the end of the duration of use of the heat exchanger, all modules have thus been wetted during a time period of substantially the same length or the duration of use of each of the wetting apparatus is substantially the same.

Since in many application cases it is not necessary for the improvement of the heat transfer that all the modules are wetted simultaneously, and since it is even conceivable that only a single module has to be wetted, the service life of the heat exchanger can be substantially increased.

The solution in accordance with the invention can be used advantageously for so long until the wetting apparatus for at least half the modules can be regulated independently of one another. Interconnected modules then form so-called module groups. Modules can advantageously be combined into module groups when the total number of modules is larger than four.

The first medium can, for example, be a liquid refrigerant agent or heat carrier or a vaporizing or condensing heating agent. In this respect, the term "heating agent" is to be understood within the framework of this application as every fluid which can advantageously be used in a heat exchanger. The term "heating agent" thus includes both the known refrigerants and any other suitable heat carrier medium, in particular also a coolant.

The second medium is the surrounding medium which is located outside the closed channel system of the heat exchanger. This second medium can be present in a liquid state, for example as water or oil, or also in the gaseous state, that is it can in particular be or contain environmental air. Heat can be absorbed by the second medium or heat can be transferred to the second medium so that it is cooled or heated.

In accordance with an embodiment, a first blocking element is provided for the first wetting apparatus and a second blocking element is provided for the second wetting apparatus. The blocking element can at least include a valve which can be actuated by a magnet, a valve which can be actuated hydraulically, a valve which can be actuated pneumatically or a pump.

A monitoring system can in particular be provided by means of which the period of use of each of the blocking elements can be detected so that the blocking elements can be switched in based on data on the period of use.

The monitoring system can in particular have a memory unit in which the duration of the individual wettings for each module is stored so that the total period of use and the sum of the wettings per module can be calculated and can be compared with a total period of use. Servicing intervals can also be programmed using this monitoring system so that when a specific period of use is reached, a servicing of the heat exchanger or of each of the modules can take place individually. The duration of each wetting is such that there is always a surplus of water in the heat exchanger. This has the advantage that no deposit is formed and at the same time a cleaning effect is achieved by the excess of water, thereby the life of the heat exchanger is increased.

In addition, the first wetting apparatus can be switched in offset by a time period from the second wetting apparatus. As required, only one single wetting apparatus of the respective module having the lowest period of use can be switched in respectively. If the switching in of a single wetting apparatus is not sufficient to obtain the required heat exchange power, it is possible to switch in one or further wetting apparatus. The monitoring system in this case automatically adds up the individual periods of use of each wetting apparatus to a total period of use of the respective wetting apparatus.

The closed channel system can include at least one tubular system, a system of fins or a system of plates for taking up the first fluid medium. The closed channel system can in particular be designed as a finned tubular heat exchanger which is manufactured in accordance with a method disclosed, for example, in WO2011/034444 A1. The fins are stamped using a press and a special tool and are placed in packets with one another. Subsequently, pipes are inserted between two respective adjacent fins. These pipes are subsequently widened mechanically or hydraulically so that a very good contact, and thus a good heat transition, arises between the pipe and the fin. The pipes which traverse the fins are connected to one another by brackets at their ends or are connected to one another, for example by soldering, by an inlet tank and outlet tank.

As a further advantageous measure, the first module and the second module of the heat exchanger are configured such that the closed channel system can be wetted directly by means of the first wetting apparatus and/or by means of the second wetting apparatus.

In accordance with an embodiment, the channel system is arranged at an angle of inclination to the vertical direction. The arrangement proposed in WO2010/040635 A1 in which a plurality of microchannel heat transfer elements and a plurality of heat exchange ribs are provided which are connected to one another in a thermally conductive manner has in particular proved to be advantageous for the use of a module having microchannel heat transfer elements. Air channels are formed by the heat exchange ribs. The air in the air channels is kept in motion by a ventilation apparatus.

This heat exchange arrangement includes a wetting apparatus to wet with liquid, for example water, the closed channel system which includes at least one pipe system, a system of fins or a system of plates for receiving the first fluid medium, in particular microchannel heat transfer elements and/or heat exchange ribs The modules are arranged at an angle of inclination with respect to the perpendicular direction, that is to the vertical direction. The angle is advantageously determined in that the gravity and/or the intertie forces which act on drops of the liquid on or in a heat exchanger module in operation are in balance with the buoyancy forces of the airflow. In accordance with a variant, the angle with respect to the vertical direction lies in the range from at least 10° up to and including 40°, preferably in the range from at least 15° up to and including 30°. The microchannel heat transfer elements can also be arranged at an angle to the vertical direction in their longitudinal direction. The angle can coincide with the angle of inclination of the heat exchanger module in which they are contained.

In accordance with a further embodiment, the modules have a lower side and an upper side, in particular when they are configured inclined with respect to the vertical direction. A ventilation device is provided to generate an airflow from the lower side to the upper side in the air channels. The wetting apparatus is provided to wet the microchannel heat transfer elements and/or the heat exchange ribs from the lower side or the upper side. The wetting apparatus can in particular be configured so that the microchannel heat transfer elements and/or the heat exchange ribs are wetted both from the lower side and from the upper side. The ventilation apparatus can also generate an airflow from the upper side to the lower side in the air channels.

A temperature regulation can be provided for switching in each of the first or second wetting apparatus. The temperature regulation includes a temperature measuring device which detects the temperature of the second medium. If this temperature increases over a defined limit value and if the second medium is to be cooled, one of the wetting apparatus is switched in by the control system giving the instruction to open the corresponding blocking element. If the temperature continues to rise, the control system gives the instruction to open a further blocking element for a further module. Which of the blocking elements is opened with priority depends on the stored total period of use. The control system is preferably set so that first the blocking element with the shorter total period of use is opened.

Furthermore, the heat exchanger can additionally have a humidifying device arranged at the inlet side in the airflow for cooling the air and/or a drop catcher arranged at the outlet side in the airflow.

A heat exchanger in accordance with any one of the preceding embodiments can be used in a cooling plant for room cooling and/or heat exchange. Furthermore, a heat exchanger in accordance with any one of the preceding embodiments can be used for cooling or freezing products or for refrigerating foods, in particular dairy products, beverages, pastries, finished products, sweets, vegetables, fruit or for freezing foods, in particular meat, fish, pasta or finished products or for freeze drying.

In particular the storage of fresh fruit and vegetables requires an exact knowledge of the specific properties of the products. To be able to store these products independently of the season, the demands on temperature, humidity and airflow must be specifically adapted to the product to be stored. The heat exchangers are used here for long-term storage, intermediate storage or for ripening processes, for example banana ripening plants.

A heat exchanger can be used both in the production of foods, chemical substances or active ingredients for pharmaceuticals for the cooling of the products and also for room cooling. The heat exchanger can also be used for long-term storage, for transshipment storage or fresh storage, with in particular a uniform temperature distribution, a high failure security as well as low operating costs playing a specific role for these applications. Explosion protection, corrosion protection and special hygienic regulations may additionally in particular be of importance for chemical products so that a specific room temperature must be observed as precisely as possible.

A fast cooling or fast freezing is frequently important for the cooling and freezing of products in addition to the lowering of the room temperature. The performance capability of such an industrial cooling plant can take place by high air speeds by using fans with external pressing, be special fin spacings or by an adapted air guidance.

Methods of wetting a heat exchanger include at least one first module and one second module for the heat exchange between a first fluid medium and a second fluid medium, wherein the first fluid medium is conducted through a closed channel system separate from the second fluid medium, with the closed channel system being flowed around by the second fluid medium, with the second fluid medium being gaseous. Furthermore, a first wetting apparatus is provided for the first module and a second wetting apparatus is provided for the second module by means of which the first module and the second module can be wetted by a third fluid medium, wherein the first wetting apparatus for the first module can be actuated independently of the wetting apparatus for the second module.

The method in accordance with the invention for wetting a heat exchanger has the advantage in accordance with the already described apparatus that, thanks to the wetting apparatus which can be switched in separately or individually for each module, the cooling capacity can be directly adapted to the requirement so that exactly the required cooling capacity is supplied by means of a temperature regulation. The cooling capacity is increased with respect to a heat exchanger without a wetting apparatus by the wetting with a predefined total exchange surface of the modules and with a predefined flow speed of the second medium and/or the total exchange surface of all modules is reduced for a predefined cooling capacity. The efficiency of the heat exchanger is thus increased by the wetting apparatus and is optimized by the possibility of selectively regulating the wetting apparatus of each individual module.

The first wetting apparatus can in particular be actuated simultaneously with or offset in time from the second wetting apparatus so that a local, and thus sequential, wetting of the first module can take place independently of the second module. This advantageous measure makes it possible to ensure a uniform spraying of the modules over the period of use.

In accordance with an embodiment, the exit temperature of the first fluid medium from the heat exchanger is measured and at least one of the wetting apparatus is switched in or switched off in dependence on the exit temperature.

Alternatively or in addition to this, the temperature of the second medium can also be measured and a switching in of each of the wetting apparatus can take place individually when the temperature of the second medium exceeds the maximum permitted temperature.

In accordance with a further embodiment, the period of use of each of the wetting apparatus can be registered by a monitoring system and each of the wetting apparatus can be switched in as required in dependence on the previous use period.

In accordance with an embodiment, the speed of the airflow can also be regulated such that no drops, or at most a defined quantity of drops, of the third medium present on a module, that is the liquid, can be taken along by the airflow. The quantity of the liquid supplied for wetting the microchannel heat transfer elements and/or the heat exchange ribs and the speed of the airflow can in particular be regulated such that the gravity and/or the inertia forces which act on drops of the third medium on or in a module are in balance with the buoyancy forces of the airflow.

The above description and the embodiments only serve as examples for explaining the operation of the invention. Further advantageous embodiments can be seen from the dependent claims and from the drawings. Furthermore, individual features from the embodiments described or shown can also be combined as desired within the framework of the present invention.

The invention will be explained in more detail in the following with reference to the enclosed drawings.

There are shown

Figure 1:
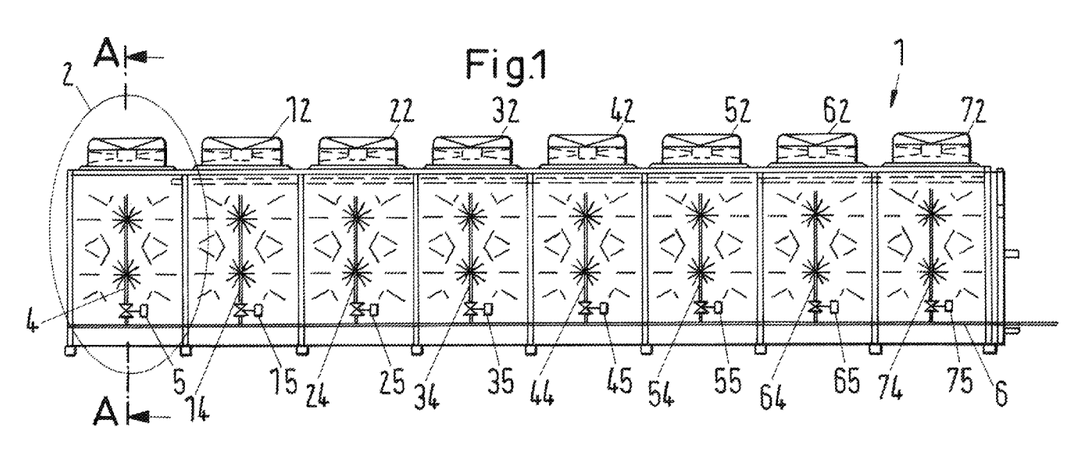
FIG. 1 a view of a module of heat exchangers in accordance with an embodiment of the invention.
Figure 2:
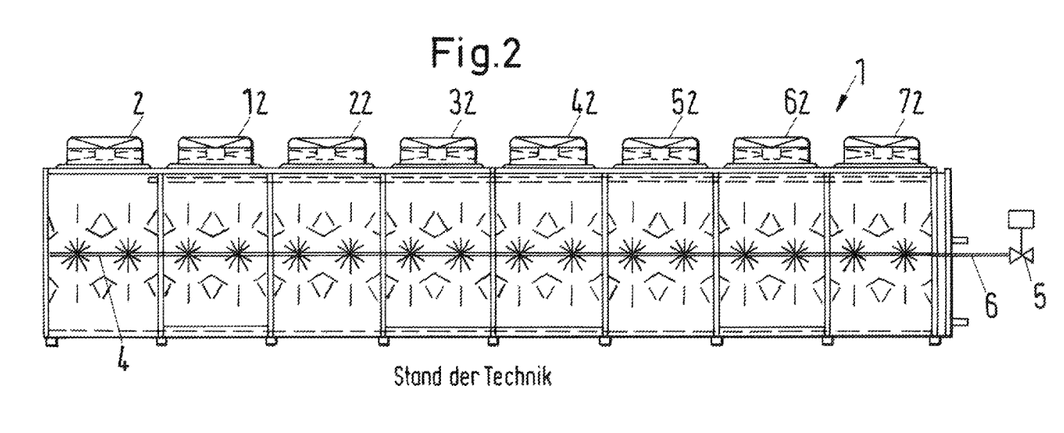
FIG. 2 a view of a module of heat exchangers in accordance with the prior art.

A heat exchange between a first fluid medium and a second fluid medium takes place in each module. The first fluid medium is guided separate from the second fluid medium through a closed channel system 3 so that the first medium does not come into contact with the second medium, which is shown in FIG. 1. The closed channel system is flowed around by the second medium. The second fluid medium is gaseous. The closed channel system 3 contains a plurality of microchannel heat transfer elements 7, 17, 27 of which only three have been provided with reference numerals for reasons of clarity. The microchannel heat transfer elements 7, 17, 27 can, for example, be designed as flat pipes which are arranged in parallel with one another. Adjacent microchannel heat transfer elements 7, 17, 27 are arranged at a spacing from one another and a plurality of heat exchange ribs 8, 18, 28 are arranged between the microchannel heat transfer elements 7, 17, 27 and are connected to the same in a heat conductive manner, for example via a solder connection. Air channels, which extend perpendicular to the image plane in the module shown in FIG. 2, are formed by the heat exchange ribs 8, 18, 28. The heat exchange ribs are as a rule made from a folded strip of sheet metal which can have a zigzag pattern.

The microchannel heat transfer elements 7, 17, 27 can be made as an extruded section which is manufactured from a material having good thermal conductivity such as aluminum or an aluminum alloy. The microchannel heat transfer elements 7, 17, 27, that is in the present case the extruded sections, contain a plurality of channels having a diameter of 0.5 to a maximum of 3 mm.

An inlet element 9 which opens into an inlet tank channel 10 is provided for feeding in the second medium. The microchannel heat transfer elements 7, 17, 27 lead from the inlet tank channel 10 to the outlet tank channel 20 which opens into an outlet element 19.

The individual parts of the module such as the microchannel heat transfer elements 7, 17, 27, the heat exchange ribs 8, 18, 28, the inlet and outlet tank channels 10, 20 and the inlet and outlet elements 9, 19 are advantageously produced from aluminum or an aluminum alloy and the assembled parts are soldered to one another in a soldering furnace.

Figure 5:
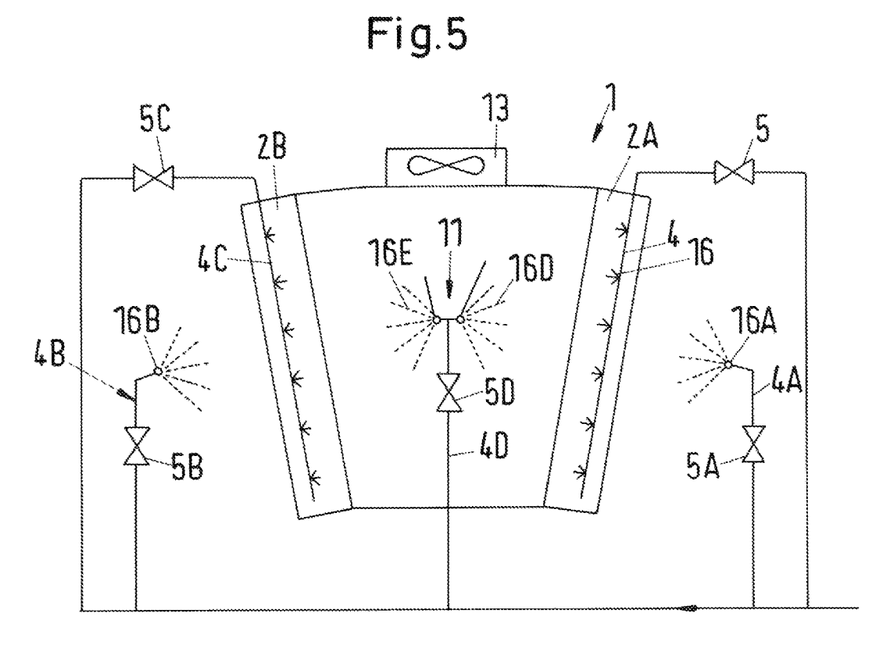

FIG. 1 shows a wetting apparatus 4 for the first module 2 as well as corresponding second to eighth wetting apparatus 14, 24, 34, 44, 54, 64, 74 for the second to eighth modules 12, 22, 32, 42, 52, 62, 72. Since all modules and all wetting apparatus have substantially the same design, only the wetting apparatus 4 for the first module 2 will be described in the following for reasons of simplicity, for which purpose reference should also be made to FIG. 5. FIG. 5 shows a section along the line A-A of FIG. 1.

The wetting apparatus is equipped with spray nozzles 16 to wet the second fluid medium with a third fluid medium. The spray nozzle 16 may preferably be for example a hollow-cone nozzle, a flat spray nozzle. Advantage of the flat spray nozzle is that they have a larger cross-section and therefore less spray nozzles 16 are required. Furthermore flat spray nozzles generate a more uniform spray pattern than with hollow cone nozzles that prevent the complete evaporation of the water on the heat exchanger and thus that deposit can form.

The second medium is in particular a gas, preferably environmental air. The third medium is preferably a liquid, in particular water. A first wetting apparatus 4 is provided for the first module and a second wetting apparatus 14 is provided for the second module 12 as well as further wetting apparatus 24, 34, 44, 54, 64, 74 for each of the modules 22, 32, 42, 52, 62. 72. Each of the wetting apparatus for each module 2 can be actuated independently of the wetting apparatus for every other module. There is naturally also the possibility that modules are supplied pairwise from a wetting apparatus, which is shown as a variant in FIG. 5.

FIG. 2 shows a wetting apparatus in accordance with the prior art. As in FIG. 1, this heat exchanger 1 has a first module 2 and a second module up to an eighth module 12, 22, 32, 42, 52, 62, 72. Each of the modules is equipped with a ventilation apparatus, for example a fan, to allow a throughflow of the module with air. Each nodule is also equipped with a wetting apparatus 4. However, this wetting apparatus can only be regulated centrally by means of a single blocking element 5. This means that in this case either all the modules or none of the modules are sprayed.

Figure 3:
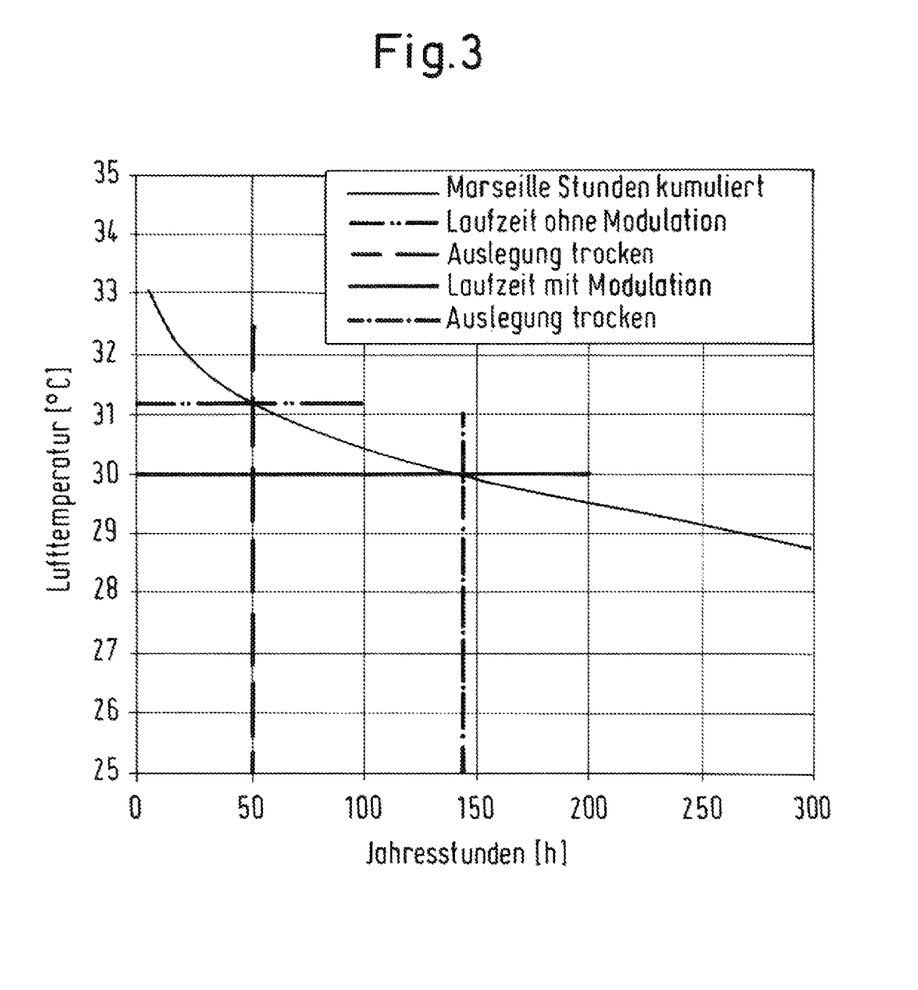
FIG. 3 a diagram illustrating the advantages of the heat exchanger in accordance with the invention.

FIG. 3 shows a diagram in which the operating hours of the heat exchanger are entered on the abscissa. The air temperature is entered on the ordinate. The diagram illustrates the advantages of the invention using an embodiment. The dry design temperature of 31.2° C. is lowered to 30.0° C. due to the solution, in accordance with the invention, with the period of use being increased from 50 h/a to 145 h/a with the same framework conditions. In the example in accordance with FIG. 3, the framework conditions were given as follows: 50 h duration of the spraying per module or 50 h duration of the spraying per heat exchanger.

Figure 4:
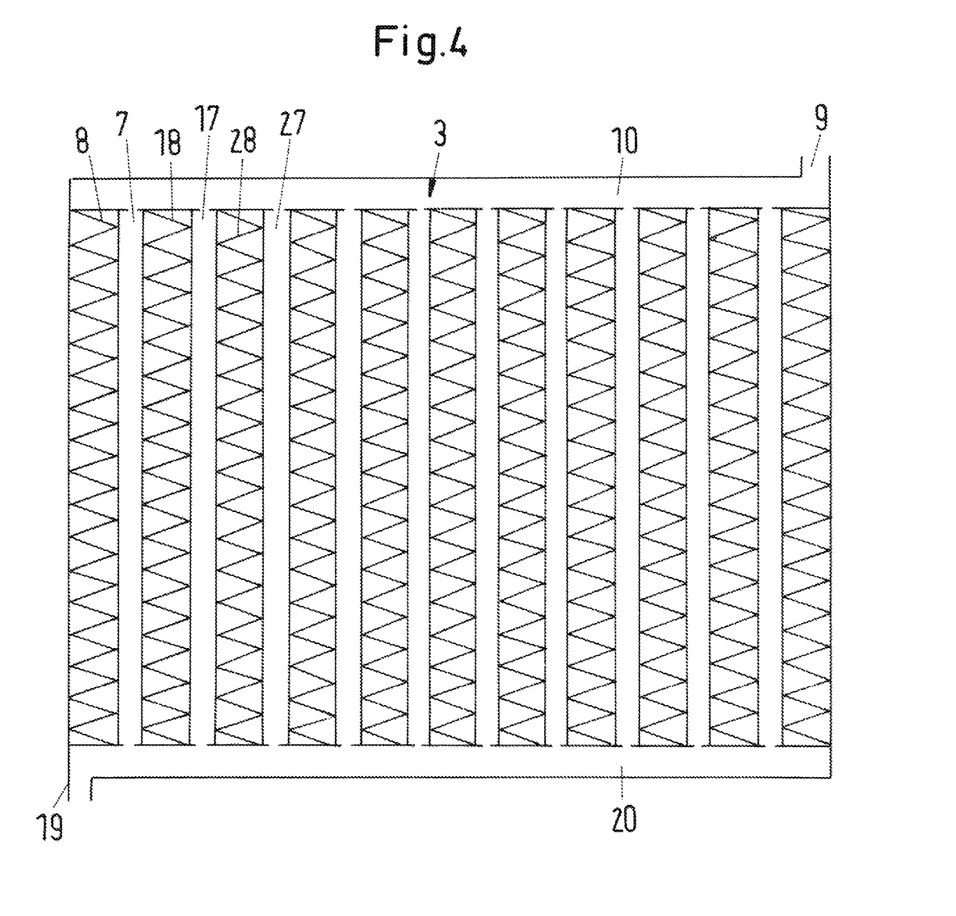
FIG. 4 a schematic representation of the channel system of a heat exchanger; and The heat exchanger 1 in accordance with FIG. 1 has a wetting apparatus. This heat exchanger 1 has a first module 2 and a second module up to an eighth module 12, 22, 32, 42, 52, 62, 72. Each of the modules is equipped with a ventilation apparatus, for example a fan, to allow a throughflow of the module with air.

FIG. 4 shows a possible design of a module of a heat exchanger. The subject matter of FIG. 4 was already looked at an earlier point.

FIG. 5 shows a section through an arrangement of two oppositely disposed module pairs 2A, 2B of a module 2 of a heat exchanger 1 which shows different possibilities of the arrangement of wetting apparatus 4, 4A, 4B, 4C, 4D. Each of the module pairs 2A, 2B can form an independent module; alternatively the module 2 could be arranged in ring form about the centrally arranged air channel 11. A ventilation device 13 is provided which sucks in air from the environment and conducts it through the air channel 11. Each of the modules can be designed as described in connection with FIG. 4. It is also shown in FIG. 5 that each of the modules 2A and 2B includes an angle of inclination to the vertical direction. This angle with respect to the vertical direction can lie in the range from at least 10° up to and including 40°, preferably in the range from at least 15° up to and including 30°. The angle is advantageously determined in that the gravity and/or the intertie forces which act on drops of the liquid which forms the third medium on or in a module in operation are in balance with the buoyancy forces of the airflow. The size and number of the modules 2A, 3b is usually defined in accordance with the required cooling capacity.

The wetting apparatus 4 is composed of a line which feeds a plurality of spray nozzles which are arranged behind one another and of which only a single one is provided with a reference numeral. The supply of liquid to the spray nozzles 16 can be suppressed using the blocking element 5. The wetting apparatus 4A in accordance with a variant shown in FIG. 5 can naturally also only have a single spray nozzle 16A. The supply of liquid to the spray nozzles 16A can be suppressed using the blocking element 5A.

A wetting apparatus 4B can correspondingly be provided for the second module 2B having a spray nozzle 16B which can be regulated by the blocking element 5B in the same way as is shown for the wetting apparatus 4A. A wetting apparatus 4C has, analogously to the wetting apparatus 4, a plurality of spray nozzles 16C which can be regulated together via the blocking element 5C.

In addition or as an alternative to this, the wetting apparatus 4D can also be arranged between the two modules 2A and 2B in the air channel 11. In this case, both the module 2A and the module 2B are simultaneously supplied with liquid from the spray nozzles 16D, 16E, with the spray nozzles 16D being directed in the direction of the module 2A and the spray nozzles 16E being oriented in the direction of the module 2B. A blocking element 5D regulates the liquid supply to both spray nozzles 16D and 16E. Provision can alternatively also be made to provide one blocking element each for each of the spray nozzles 16D and 16E.

The invention claimed is:

1. A method of wetting a heat exchange arrangement including at least one first module and one second module for the heat exchange between a first fluid medium and a second fluid medium,
   wherein the first module includes a first ventilation apparatus and the second module includes a second ventilation apparatus, and the first ventilation apparatus and the second ventilation apparatus allow a throughflow of the first module and the second module with the second fluid medium respectively,
   wherein the first fluid medium is conducted through closed channel systems of the first and second module separate from the second fluid medium,
   wherein the second fluid medium is arranged to flow around the closed channel systems, with the second fluid medium being gaseous, and
   wherein a first wetting apparatus is provided for wetting with a third fluid medium the first module and a second wetting apparatus is provided for wetting with the third fluid medium the second module, wherein the first wetting apparatus and the second wetting apparatus are actuated independently of each other to independently adjust a cooling capacity of the first and second module, respectively, of the heat exchange arrangement to cool the first fluid medium.

2. The method in accordance with claim 1, wherein the exit temperature of the first fluid medium from the heat exchange arrangement is measured and at least one of the wetting apparatus can be switched in or switched off in dependence on the exit temperature.

* * * * *